United States Patent
Sotoyama (10) Patent No.: US 11,027,682 B2
(45) Date of Patent: Jun. 8, 2021

(54) FRONT PORTION STRUCTURE OF VEHICLE

(71) Applicant: Toyota Jidosha Kabushiki Kaisha, Toyota (JP)

(72) Inventor: Yoshitaka Sotoyama, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 16/542,909

(22) Filed: Aug. 16, 2019

(65) Prior Publication Data

US 2020/0070760 A1 Mar. 5, 2020

(30) Foreign Application Priority Data

Aug. 29, 2018 (JP) .............................. JP2018-160779

(51) Int. Cl.
*B60R 19/34* (2006.01)

(52) U.S. Cl.
CPC .................................... *B60R 19/34* (2013.01)

(58) Field of Classification Search
CPC ....... Y02T 10/64; Y02T 10/72; Y02T 10/645; Y02T 10/70; B60L 2200/26; B62D 25/145; B62D 25/142; B60H 1/0055; B60K 37/00; B60R 16/0207
See application file for complete search history.

(56) References Cited

U.S. PATENT DOCUMENTS

| | | | | |
|---|---|---|---|---|
| 10,875,580 B2* | 12/2020 | Shinya | ................ | B62D 21/152 |
| 2002/0158384 A1* | 10/2002 | Beck | ........................ | F16F 7/12 |
| | | | | 267/139 |
| 2004/0041416 A1* | 3/2004 | Harrison | ................ | B60D 1/488 |
| | | | | 293/117 |
| 2008/0116719 A1* | 5/2008 | Bae | ........................ | B60R 19/34 |
| | | | | 296/187.09 |
| 2009/0001737 A1* | 1/2009 | Salomonsson | .......... | B60R 19/34 |
| | | | | 293/133 |
| 2009/0261602 A1* | 10/2009 | Karlander | ............... | B60R 19/34 |
| | | | | 293/132 |
| 2010/0066124 A1* | 3/2010 | Terada | .................... | B60R 19/34 |
| | | | | 296/187.09 |

(Continued)

FOREIGN PATENT DOCUMENTS

| | | |
|---|---|---|
| EP | 3132980 A1 | 2/2017 |
| JP | 2017-039467 A | 2/2017 |
| WO | 2014207544 A1 | 12/2014 |

*Primary Examiner* — Kiran B Patel
(74) *Attorney, Agent, or Firm* — Dinsmore & Shohl LLP (57) ABSTRACT

A front portion structure of a vehicle includes a front bumper R/F, a side member, and a crush box inserted between the front bumper R/F and the side member, the side member having a first region connected to the crush box and a second region extending from a rear end of the first region, in which a vehicle-widthwise outer side surface of the first region is at a position being bent with respect to a vehicle-widthwise outer side surface of the crush box so as to form a protrusion protruding vehicle-widthwise outward, and a vehicle-widthwise outer side surface of the second region is at a position being bent from the vehicle-widthwise outer side surface of the first region so as to form a protrusion protruding vehicle-widthwise inward, and a reinforcement plate is joined to the vehicle-widthwise outer side surface in the first region.

5 Claims, 4 Drawing Sheets

(56) References Cited

U.S. PATENT DOCUMENTS

| | | | | |
|---|---|---|---|---|
| 2012/0025547 | A1* | 2/2012 | Haneda | B60R 19/34 293/133 |
| 2012/0228890 | A1* | 9/2012 | Frank | B60R 19/34 293/155 |
| 2012/0248819 | A1* | 10/2012 | Okamura | B60R 19/12 296/187.1 |
| 2013/0076051 | A1* | 3/2013 | Baldwin | B60R 19/34 293/133 |
| 2014/0062107 | A1* | 3/2014 | Kim | B60R 19/34 293/133 |
| 2014/0319860 | A1* | 10/2014 | Braunbeck | B60R 19/34 293/133 |
| 2014/0354008 | A1* | 12/2014 | Sakakibara | B60R 19/34 296/187.1 |
| 2015/0035316 | A1* | 2/2015 | Kuriyama | B62D 25/082 296/187.1 |
| 2015/0183468 | A1* | 7/2015 | Shirooka | B62D 21/155 296/187.1 |
| 2015/0298634 | A1* | 10/2015 | Hara | B60R 19/24 293/133 |
| 2015/0307134 | A1* | 10/2015 | Hirota | B62D 25/082 296/187.09 |
| 2015/0343972 | A1* | 12/2015 | Lee | B60R 19/34 293/133 |
| 2015/0360632 | A1* | 12/2015 | Nishida | B62D 25/082 293/133 |
| 2015/0360633 | A1* | 12/2015 | Nishida | B62D 25/082 293/133 |
| 2015/0360726 | A1* | 12/2015 | Yuge | B62D 21/11 180/312 |
| 2016/0039374 | A1* | 2/2016 | Sugano | B62D 25/08 293/133 |
| 2016/0144814 | A1* | 5/2016 | Ahn | B23K 9/16 293/133 |
| 2017/0021868 | A1* | 1/2017 | Watanabe | B62D 21/152 |
| 2017/0050598 | A1 | 2/2017 | Taguchi et al. | |
| 2019/0061658 | A1* | 2/2019 | Haggstrom | B60R 19/34 |
| 2019/0233014 | A1* | 8/2019 | Tagaito | B60R 19/24 |
| 2019/0351854 | A1* | 11/2019 | Bae | B60R 19/18 |
| 2020/0317149 | A1* | 10/2020 | Honing | B60R 19/18 |
| 2020/0324823 | A1* | 10/2020 | Kawamura | B62D 21/08 |
| 2020/0331534 | A1* | 10/2020 | Maeda | B62D 21/15 |
| 2020/0384934 | A1* | 12/2020 | Yotsuyanagi | B60R 19/34 |

\* cited by examiner

FRONT PORTION STRUCTURE OF VEHICLE

CROSS REFERENCE TO RELATED APPLICATION

This application claims priority to Japanese Patent Application No. 2018-160779 filed on Aug. 29, 2018, which is incorporated herein by reference in its entirety including the specification, claims, drawings, and abstract.

TECHNICAL FIELD

The present disclosure discloses a front portion structure of a vehicle equipped with a front bumper reinforcement extending along a vehicle width direction, a side member extending along a vehicle longitudinal direction, and a crush box inserted between the front bumper reinforcement and the side member.

BACKGROUND

In general, a front bumper reinforcement extending along a vehicle width direction is disposed on a front portion of a vehicle. Further, a pair of right and left side members are disposed rearward of the front bumper reinforcement so as to extend along a vehicle longitudinal direction. Moreover, a crush box is inserted between the side member and the front bumper reinforcement. The crush box is configured to be easily collapsed along an axial direction thereof when a vehicle undergoes a head-on collision (including a full wrap collision, an offset collision, and a micro wrap collision) with an obstacle, to thereby absorb collision energy. A part of collision energy which has not been absorbed by the crush box is absorbed by the side members located rearward of the crush box.

In connection with the above-described structure, techniques for improving efficiency in absorption of collision energy by the crush box and by the side members have conventionally been suggested. For example, Patent Document 1 (JP 2017-039467 A) discloses that a first protruding portion and a second protruding portion, which are protruded outward in a vehicle width direction, are disposed on outer side surfaces of the crush box and the side members. In Patent Document 1, a ridge line of the first protruding portion and a ridge line of the second protruding portion are defined to continue via a plate with each other. When configured in this way, a collision load can be effectively transmitted from the crush box to the side members. Further, in Patent Document 1, the second protruding portion has a width which is increased in a height direction toward the rear of the vehicle to a width equal to widths of the side members in the height direction. In this configuration, because the side members are easily bent or folded at a rear end of the second protruding portion to a certain extent, behavior of the side members at a collision can be controlled in some degree.

CITATION LIST

Patent Literature

Patent Document 1: JP 2017-039467 A

Under these circumstances, it is desirable that the crush box be able to initially absorb collision energy sufficiently at the time of a head-on collision of a vehicle. Then, it is also desirable that the side member be configured to absorb only a portion of the collision energy which has not been absorbed by the crush box. Therefore, in an early phase of a head-on collision, it is required that the crush box be apt to become collapsed along its axial direction while the side member be resistant to deformation. After the crush box has been collapsed sufficiently, it is required that the side member be deliberately deformed in order to absorb the collision energy.

However, in the configuration disclosed in Patent Document 1, a vehicle-widthwise outer side surface of the second protruding portion is in a position bent with respect to a vehicle-widthwise outer side surface of the crush box, while a vehicle-widthwise outer side surface of the side member itself is in a position which is barely bent with respect to the vehicle-widthwise outer side surface of the crush box. Because of this, there has been a danger, in the technique disclosed in Patent Document 1, that a collision load exerted on the crush box would be immediately transmitted to the side member. In this case, the side member could be deformed before the crush box has been sufficiently collapsed, which would hamper the crush box from absorbing collision energy to a sufficient extent, resulting in decreased efficiency in absorption of collision energy by the vehicle as a whole.

The present disclosure discloses a front portion structure of a vehicle capable of absorbing collision energy with an improved degree of efficiency.

SUMMARY

In an aspect of this disclosure, a front portion structure of a vehicle includes a front bumper reinforcement extending along a vehicle width direction, a side member disposed rearward of the front bumper reinforcement in the vehicle so as to extend along a vehicle longitudinal direction, and a crush box disposed between the front bumper reinforcement and the side member, the side member having a first region connected to the crush box and a second region extending from a rear end of the first region, in which a vehicle-widthwise outer side surface of the side member in the first region is arranged at a position being bent with respect to a vehicle-widthwise outer side surface of the crush box so as to form a protrusion protruding outward in the vehicle width direction, while a vehicle-widthwise outer side surface of the side member in the second region is arranged at a position being bent with respect to the vehicle-widthwise outer side surface in the first region so as to form another protrusion protruding inward in the vehicle width direction, and a reinforcement plate is attached to the vehicle-widthwise outer side surface in the first region.

Because the vehicle-widthwise outer side surface in the first region is at the position being bent with respect to the vehicle-widthwise outer side surface of the crush box so as to form the protrusion protruding outward in the vehicle width direction, transmission of a collision load from the crush box to the side member is deferred until the crush box is sufficiently collapsed. Then, after the crush box is sufficiently collapsed, the collision load is transmitted from the crush box via the first region to a folding site which is the bent position between the first region and the second region. During the transmission, because the first region is reinforced by the reinforcement plate and therefore resistant to deformation, such as warping, the collision load can be reliably transmitted to the bent position. In this way, it becomes possible for the side member to be bent or folded at a predetermined location (the folding site), and thus behavior of the side member can be controlled. In addition, according to the structure disclosed herein, because both the crush box and the side member are capable of sufficiently absorbing collision energy, total efficiency in absorption of the collision energy can be improved in the vehicle.

In an aspect, an angle of inclination of the vehicle-widthwise outer side surface of the first region relative to the vehicle longitudinal direction may be greater than an angle of inclination of the vehicle-widthwise outer side surface of the crush box relative to the vehicle longitudinal direction.

The above configuration can further ensure that the crush box is reliably collapsed along its axial direction while hampering transmission of the collision load to the vehicle-widthwise outer side surface of the first region.

In another aspect, the crush box may be connected to the side member via a joint portion, and the joint portion may be integrally formed with the crush box so as to extend firom a rear end of the crush box, and may be joined to an interior periphery surface of the side member.

When configured as described above, the joint portion for connecting the crush box and the side member is arranged substantially parallel to a direction in which the load is transmitted, which further hampers transmission of the collision load to the side member unless the crush box is sufficiently collapsed.

In another aspect, the reinforcement plate may be formed in a shape that covers almost an entire area of the vehicle-widthwise outer side surface in the first region.

When configured as described above, the vehicle-widthwise outer side surface in the first region includes no local, vulnerable portions, which can further ensure that the side member is bent or folded at the predetermined location (the folding site).

In another aspect, a gusset portion outwardly protruded from the reinforcement plate in the vehicle width direction may be disposed on a front end of the reinforcement plate.

When configured as described above, after the crush box is collapsed, the gusset portion can also function to receive the collision load. Because of this, an area where the collision load is received can be increased, leading to further reliable transmission of the collision load to the side member.

With the front portion structure of a vehicle disclosed herein, collision energy can be absorbed with an increased degree of efficiency.

BRIEF DESCRIPTION OF DRAWINGS

An embodiment of the present disclosure will be described based on the following figures, wherein.

DESCRIPTION OF EMBODIMENT

Figure 1:
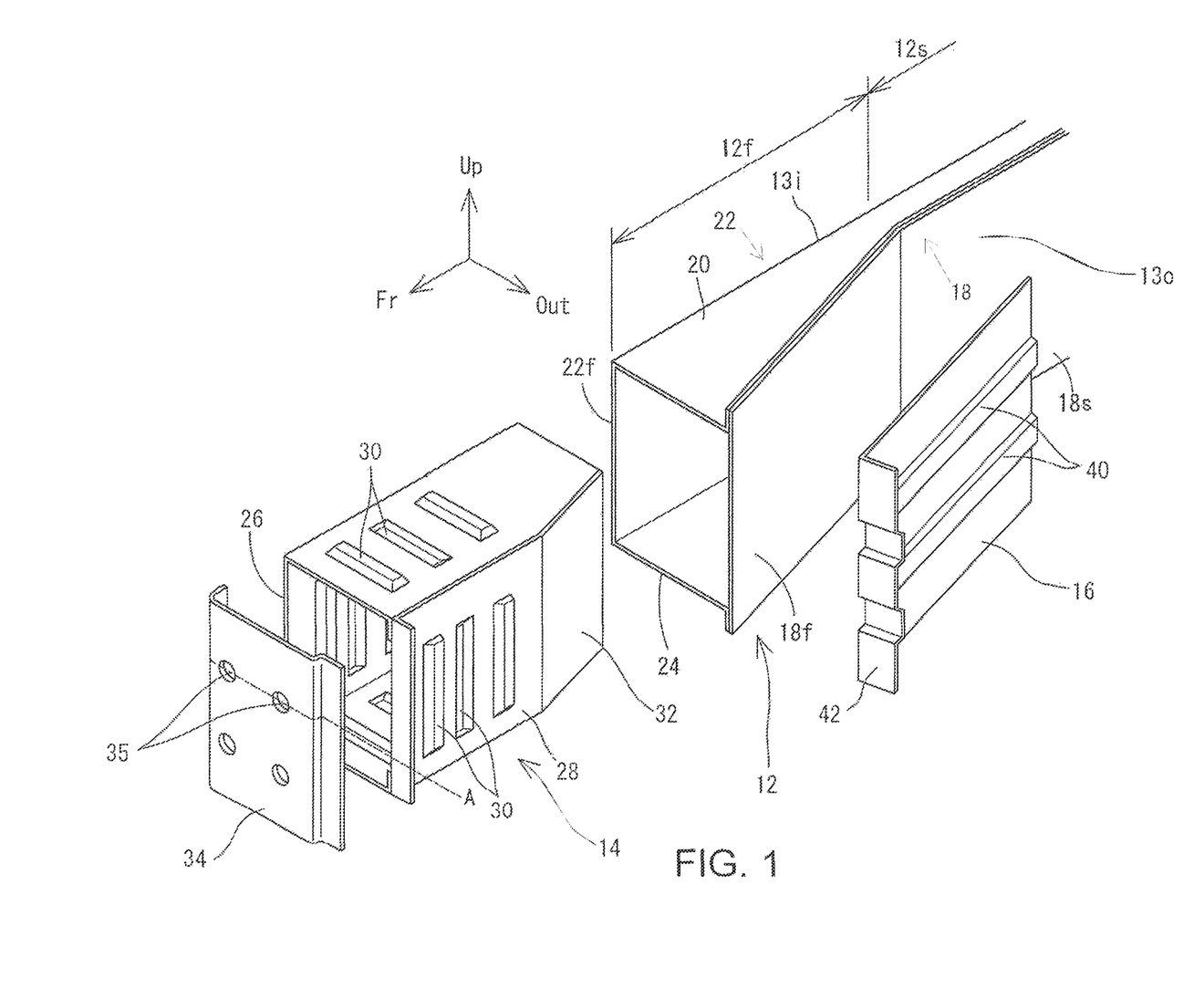
FIG. 1 is an exploded perspective view schematically showing a front portion structure of a vehicle.
Figure 2:
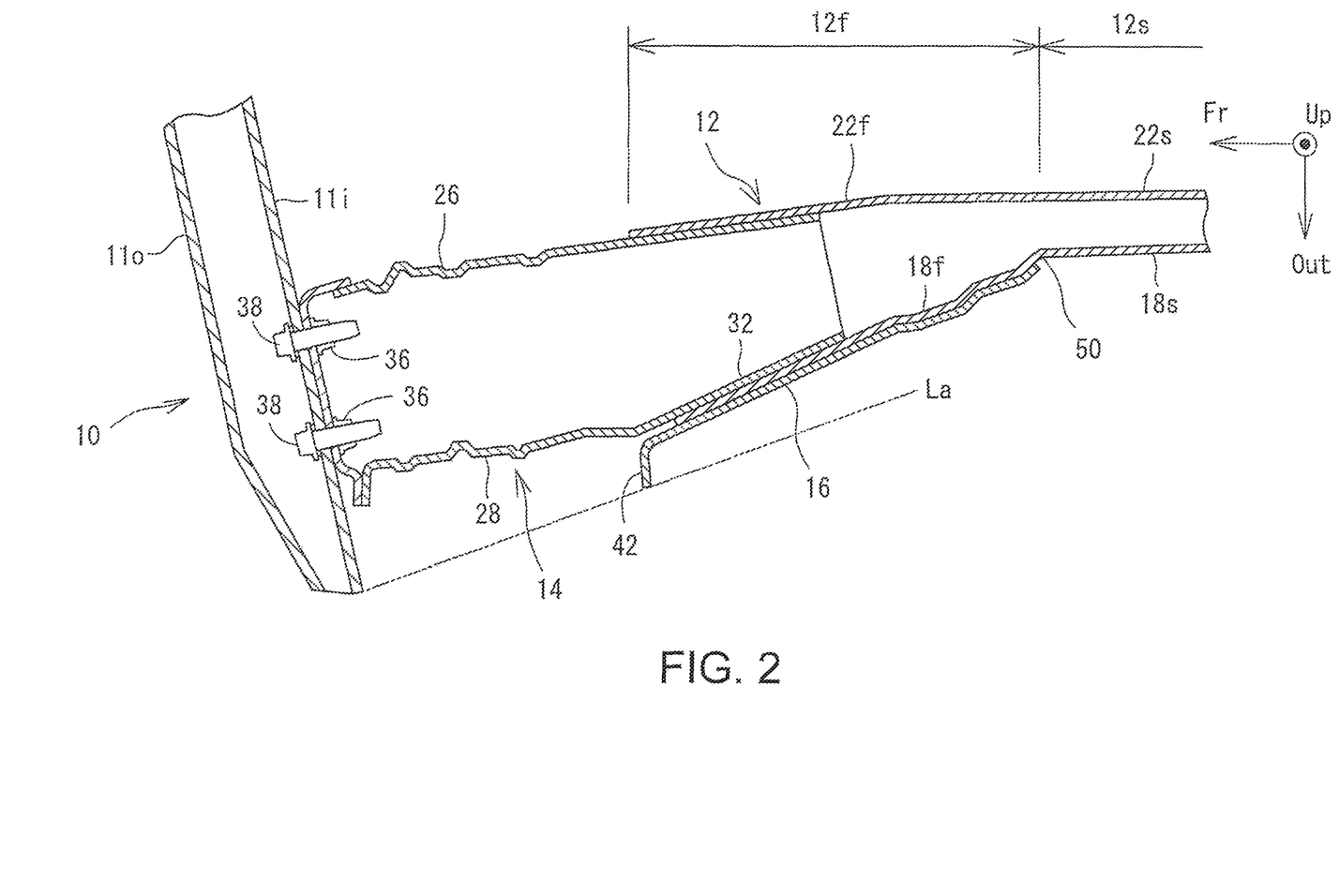
FIG. 2 is a cross section view taken at a height A indicated in FIG. 1.

Hereinafter, a front portion structure of a vehicle will be described with reference to the drawings. FIG. 1 is a schematic perspective view of the front portion structure of a vehicle, and FIG. 2 is a cross section view taken at a height A indicated in FIG. 1. In FIG. 1, reference sign "Fr" represents the front of a vehicle, reference sign "Up" represents an upper side of the vehicle, and reference sign "Out" represents the outside in a vehicle width direction.

A front bumper reinforcement (hereinafter abbreviated as "front bumper R/F") 10 is disposed on a front portion of the vehicle (see FIG. 2). The front bumper R/F 10 is a long frame member extending along a vehicle width direction. The front bumper R/F 10 is gently curved so as to be protruded forward of the vehicle in a plan view. Accordingly, each end portion of the front bumper R/F 10 in the vehicle width direction is inclined rearwardly toward an outer end, in the vehicle width direction, of the front bumper R/F 10.

The front bumper R/F 10 has a substantially rectangular closed shape in cross section. The front bumper R/F 10 is composed, for example, by joining a bumper outer panel 11o formed substantially in the shape of a hat which is open to the rear of the vehicle and a bumper inner panel 11i formed substantially in the shape of a flat plate which covers an opening of the bumper outer panel 11o.

A pair of side members 12 are placed on a rear side of the front bumper R/F 10 so as to be spaced from each other in the vehicle width direction. The side member 12 is a frame member having a longer length in a vehicle longitudinal direction. The side member 12 has a substantially rectangular closed shape in cross section. The side member 12 is composed, for example, by joining together a side member inner panel 13i formed, in cross section, substantially in the shape of a hat which is open toward the outside in the vehicle width direction and a side member outer panel 13o formed substantially in the shape of a flat plate which covers an opening of the side member inner panel 13i. In this example, the side member outer panel 13o mainly forms a vehicle-widthwise outer side surface 18 of the side member 12, and the side member inner panel 13i mainly forms a vehicle-widthwise inner side surface 22, a top surface 20, and a bottom surface 24 of the side member 12.

The side member 12 is broadly divided into a first region 12f where the width of the side member 12 is narrowed toward the rear of the vehicle, and a second region 12s extending rearward from a read end of the first region 12f. Hereinafter, a portion of a vehicle-widthwise inner side surface 22 of the side member 12 that is located in the first region 12f is referred to as a "first inner side surface 22f", while a portion of the vehicle-widthwise inner side surface 22 that is located in the second region 12s is referred to as a "second inner side surface 22s". Similarly, a portion of a vehicle-widthwise outer side surface 18 of the side member 12 that is located in the first region 12f is referred to as a "first outer side surface 18f", and a portion of the vehicle-widthwise outer side surface 18 that is located in the second region 12s is referred to as a "second outer side surface 18s".

Both the first inner side surface 22f and the second inner side surface 22s extend along a direction substantially parallel to the vehicle longitudinal direction, and smoothly continue with each other. However, the first inner side surface 22f is slightly bent at some midpoint of its length. More specifically, a front half portion of the first inner side surface 22*f* extends along a direction normal to a rear end surface (the bumper inner panel 11*i*) of the front bumper R/F 10, that is, a direction which is inclined slightly inward toward the rear with respect to the vehicle longitudinal direction. On the other hand, a rear half portion of the first inner side surface 22*f* and the second inner side surface 22*s* extend along the direction substantially parallel to the vehicle longitudinal direction.

The first outer side surface 18*f* extends along a direction which is inclined significantly inward toward the rear with respect to the vehicle longitudinal direction, while the second outer side surface 18*s* extends along the direction substantially parallel to the vehicle longitudinal direction. Accordingly, it can be said that the second outer side surface 18*s* extends along a direction which is bent from the first outer side surface 18*f* so as to form a protrusion protruding inward in the vehicle width direction. A bent position located at an interface between the first outer side surface 18*f* and the second outer side surface 18*s* functions as a folding site 50 which is deliberately initially caused to be folded when a head-on collision of the vehicle occurs. An angle of inclination of the first outer side surface 18*f* relative to the vehicle longitudinal direction is greater than an angle of inclination of the first inner side surface 22*f* relative to the vehicle longitudinal direction. Because of this, a width of the first region 12*f* is narrowed toward the rear of the vehicle.

A crush box 14 is inserted between the front bumper R/F 10 and the side member 12. The crush box 14 is designed to absorb collision energy when it is collapsed along its axial direction at a head-on collision of the vehicle, that is, in a case where an obstacle collides with a front portion of the vehicle. The crush box 14 has a shape of a rectangular pipe which is substantially rectangular in cross section. Beads 30 extending along a direction (such as a vertical direction or the vehicle width direction) substantially orthogonal to the axial direction are formed on peripheral exterior surfaces of the crush box 14 for inducing the crush box 14 to be collapsed.

An outer side surface 28 and an inner side surface 26 of the crush box 14 in the vehicle width direction are both designed to extend along the direction normal to the rear end surface (the bumper inner panel 11*i*) of the front bumper R/F 10, that is, the direction which is inclined slightly inward toward the rear with respect to the vehicle longitudinal direction. Accordingly, a dimension of the crush box 14 in the vehicle width direction is maintained substantially constant. When described in another perspective, the inner side surface 26 of the crush box 14 extends along the direction almost the same as that of the inner side surface 22*f* of the side member 12, so that the surfaces 26 and 22*f* are arranged on a substantially straight line. On the other hand, the outer side surface 28 of the crush box 14 is inclined at an angle relative to the vehicle longitudinal direction that is smaller than an angle of inclination of the first outer side surface 18*f* of the side member 12. Therefore, the first outer side surface 18*f* is in a position which is bent with respect to the outer side surface 28 of the crush box 14 so as to form a protrusion protruding outward in the vehicle width direction. Such placement of the first outer side surface 18*f* in the position being bent with respect to the outer side surface 28 of the crush box 14 constitutes a hindrance to transmission of a collision load from the outer side surface 28 of the crush box 14 to the first outer side surface 18*f*, which will be explained further below.

A joint portion 32 integrally formed with the crush box 14 is extended from a rear end of the crush box 14. The joint portion 32 is inserted into the side member 12 in the shape of a rectangular pipe, and joined to an interior periphery surface of the side member 12. A front end of the crush box 14 is joined to a connector plate 34 which covers a front end opening of the crush box 14. Two or more (in the example shown in FIG. 1, four) plate-side fastening holes 35 are defined in the connector plate 34. Weld nuts 36 are fixed to the connector plate 34 at locations behind the plate-side fastening holes 35, respectively. Meanwhile, bumper-side fastening holes (not illustrated) are defined in the bumper inner panel 11*i* at locations corresponding to the plate-side fastening holes 35. Then, the crush box 14 is screw-fastened to the front bumper R/F 10 by fastening bolts 38 which are screwed into the weld nuts 36 through the bumper-side fastening holes and the plate-side fastening holes 35.

A reinforcement plate 16 is attached to the first outer side surface 18*f*. The reinforcement plate 16 is a plate member which is externally stacked on the first outer side surface 18*f* to cover almost the entire area of the first outer side surface 18*f*, and joined thereto. Accordingly, a front end of the reinforcement plate 16 is located in the vicinity of a front end of the first region 12*f*, and a rear end of the reinforcement plate 16 is located in the vicinity of a rear end of the first region 12*f*. Further, a height dimension of the reinforcement plate 16 is approximately equal to a height dimension of the first outer side surface 18*f*.

The reinforcement plate 16 is provided for the purpose of reliably transmitting the collision load to the folding site 50. In this regard, it is required for the reinforcement plate 16 to be resistant to the collision load exerted on the reinforcement plate 16, without getting warped or folded. In order to prevent deformation, such as warping, one or more (two, in the illustrated example) reinforcement beads 40 may be formed on the reinforcement plate 16. The reinforcement beads 40 may be, for example, protruded outward in the vehicle width direction and extended from the front end to the rear end of the reinforcement plate 16.

Further, the front end of the reinforcement plate 16 is bent to the outside in the vehicle width direction, to form a gusset portion 42 which protrudes outward in the vehicle width direction. A fastening bracket (not illustrated) for fastening a suspension member to the side member 12 is fixedly attached to the gusset portion 42. In addition, the gusset portion 42 also functions as a load receiving member which receives the collision load occurring at a head-on collision and transmits the received collision load to the reinforcement plate 16 and thus the side member 12.

A size of protrusion of the gusset portion 42 is not specifically limited. However, in order to effectively receive the load, a tip end of the gusset portion 42 may be extended to reach a predicted path line La of the end portion of the front bumper R/F 10 to be shifted by a micro wrap collision. The micro wrap collision refers to a type of collision in which an obstacle collides only with an end region of the vehicle front portion in the vehicle width direction. In a case of the micro wrap collision, the front bumper R/F 10 is predicted to be moved toward the inside and the rear of the vehicle. A chain double-dashed line indicated in FIG. 2 represents the predicted path line La of the end portion of the front bumper R/F 10 in the vehicle width direction in the case of the micro wrap collision. When the tip end of the gusset portion 42 is extended to the predicted path line La, the end portion of the front bumper R/F 10 in the vehicle width direction will impinge on the gusset portion 42 via the crush box 14 that is collapsed. In this way, the collision load can be received on a broader area of the reinforcement plate 16, which can contribute to improved efficiency in transmission of the load from the front bumper R/F 10 to the reinforcement plate 16, and thus the first outer side surface 18*f*.

Here, in order to improve efficiency in transmission of the load to the first outer side surface 18*f*, the direction along which the first outer side surface 18*f* is inclined is defined to be parallel to a shifting direction of the front bumper R/F 10 at the time of a micro wrap collision, and thus parallel to the predicted path line La. Accordingly, a straight line between the end portion of the front bumper R/F 10 in the vehicle width and the tip end of the gusset portion 42 is approximately parallel to the first outer side surface 18*f*.

Next, an action of the thus-configured front portion structure of a vehicle will be explained. When a micro wrap collision occurs, it is desirable that the crush box 14 be initially collapsed sufficiently, and the side member 12 be subsequently folded at a desired position (at the folding site 50 in this example). When the crush box 14 is deliberately initially caused to become collapsed, the vehicle can be repaired by simply replacing the crush box 14 with a new one in a case where the micro wrap collision is a minor collision. Further, when deformation of the side member 12 is induced after the crush box 14 is sufficiently collapsed, an amount of collision energy absorbed by the crush box 14 can be increased, which can, in turn, contribute to improved efficiency in absorption of collision energy by the vehicle as a whole. Moreover, after the crush box 14 is collapsed, the side member 12 is folded at the desired position (the folding site 50), which allows the side member 12 to efficiently absorb the collision energy while facilitating control of a behavior of the side member 12 at a collision.

In order to realize ideal behavior as described above, transmission of the collision load to the side member 12 should be hampered until the crush box 14 is sufficiently collapsed, and after the crush box 14 has become collapsed sufficiently, the collision load should be effectively transmitted to the side member 12. In this embodiment, the above-described behavior of load transmission is realized in such a manner that the first outer side surface 18*f* of the side member 12 is arranged in the position being bent with respect to the outer side surface 28 of the crush box 14, and is reinforced with the reinforcement plate 16.

Figure 3A:
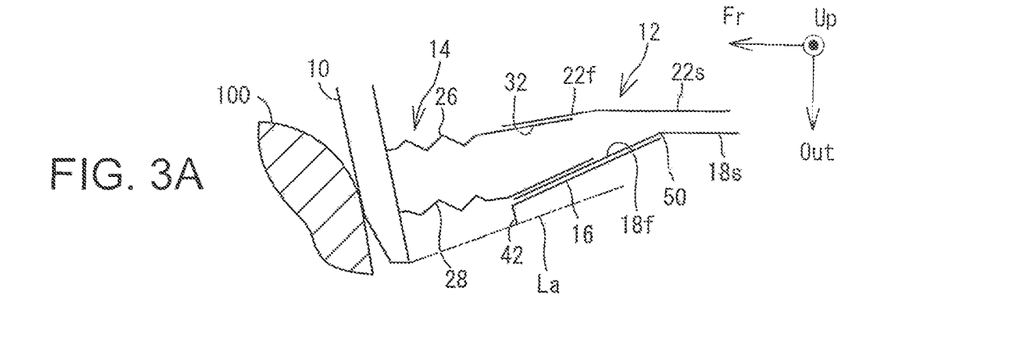
FIG. 3A is a diagram for explaining behavior of each portion during an early phase of a micro wrap collision.
Figure 3B:
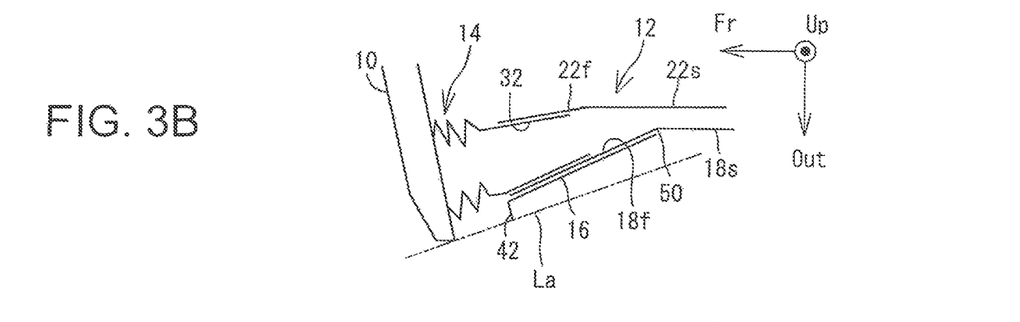
FIG. 3B is a diagram for explaining behavior of each portion when the crush box starts to be collapsed due to the micro wrap collision.

Next, behavior of each component caused by a micro wrap collision in this embodiment will be described with reference to FIGS. 3A to 3D. When a micro wrap collision occurs, that is, when an obstacle 100 collides only with a width end region of the front portion of the vehicle, as shown in FIG. 3A, the front bumper R/F 10 receives a collision load along a slanting rearward direction (a direction substantially parallel to the predicted path line La). Upon receipt of the collision load, the front bumper R/F 10 is retreated in a direction along the predicted path line La. Meanwhile, the side member 12 tries to maintain its position. As a result, a compressive force along the axial direction is exerted on the crush box 14 sandwiched between the front bumper R/F 10 and the side member 12. This causes the crush box 14 to become collapsed in the axial direction, as shown in FIG. 3B. Then, collision energy is absorbed by the crush box 14 being collapsed.

Here, a part of the collision load exerted on the outer side surface 28 of the crush box 14 is transmitted from the rear end of the outer side surface 28 to the first outer side surface 18*f* of the side member 12. However, as described above, the first outer side surface 18*f* is at the position which is bent with respect to the outer side surface 28 of the crush box 14. This causes the collision load to mostly remain in the bend portion between the first outer side surface 18*f* and the outer side member 28, with a result that hardly any of the collision load is transmitted to the first outer side surface 18*f*. Thus, in an early phase of the micro wrap collision (a phase in which the crush box 14 has not yet been collapsed sufficiently), only a small amount of the collision load is transmitted to the side member 12, and most of collision energy is consumed for collapsing the crush box 14. As a result, the crush box 14 is deliberately initially collapsed in this embodiment, while transmission of the load to the side member 12 is hindered unless the crush box 14 is collapsed sufficiently.

Figure 3C:
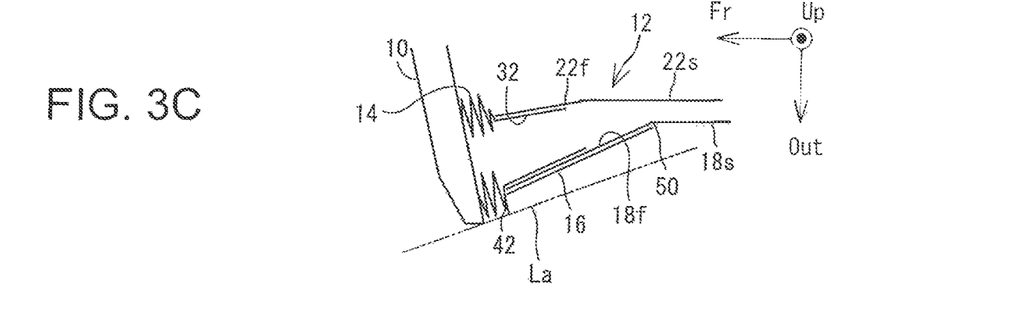
FIG. 3C is a diagram for explaining behavior of each portion after the crush box is sufficiently collapsed due to the micro wrap collision.

As shown in FIG. 3C, after the crush box 14 is sufficiently collapsed, the collision load starts to be transmitted via the collapsed crush box 14 to the side member 12. Here, the first outer side surface 18*f* is joined to the reinforcement plate 16 having the gusset portion 42 which is protruded outward in the vehicle width direction. The gusset portion 42 is hit via the collapsed crush box 14 by a portion of the front bumper R/F 10 that is protruded outward than the crush box 14 in the width direction. Consequently, the collision load is received on a broader area of the reinforcement plate 16, which contributes to improved efficiency in transmission of the collision load to the reinforcement plate 16 and thus the first outer side surface 18*f*.

Figure 3D:
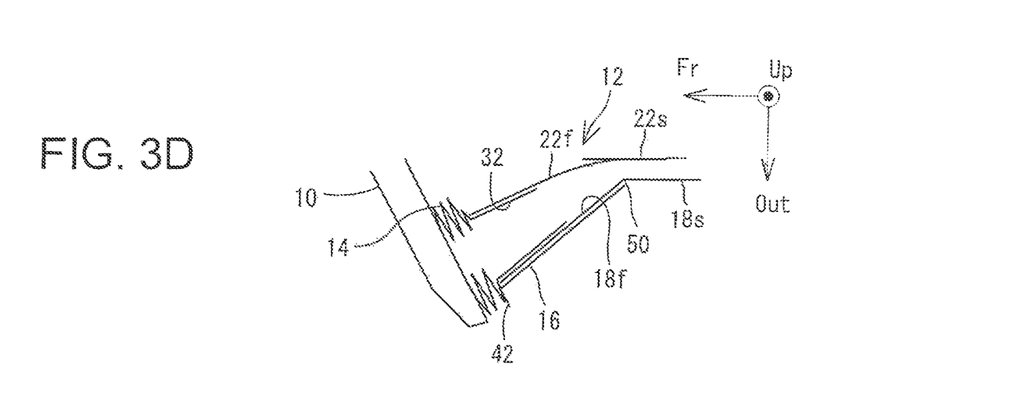
FIG. 3D is a diagram for explaining behavior of each portion when the side member is folded due to the micro wrap collision.

The first outer side surface 18*f* which is reinforced with the reinforcement plate 16 is designed to be more resistant to deformation than other portions even upon receipt of the collision load. As a result, it can be further ensured that the collision load transmitted to the reinforcement plate 16 and the first outer side surface 18*f* is apt to be transmitted to the folding site 50. Here, the folding site 50 is an interface between a reinforced region (to which the reinforcement plate 16 is joined) and a not-reinforced region (to which the reinforcement plate 16 is not joined), and is bent in advance. In this way, stress can be easily concentrated on the folding site 50. Thus, as shown in FIG. 3D, the collision load transmitted to the folding site 50 easily causes the side member 12 to be folded (plastically deformed) at the folding site 50. When the side member 12 is folded in this way, collision energy can be absorbed by the side member 12. Further, because the second outer side surface 18*s* is arranged at the position bent with respect to the first outer side surface 18*f*, and the first outer side surface 18*f* is reinforced with the reinforcement plate 16, the side member 12 can be folded at the desired location (the folding site 50). In this way, behavior of the side member 12 at the time of a collision can be controlled.

As can be clearly understood from the above explanation, because the first outer side surface 18*f* of the side member 12 is arranged at the position being bent with respect to the outer side surface 28 of the crush box 14 in this embodiment, transmission of the load to the side member 12 can be hindered during the early phase of a micro wrap collision. In addition, because the first outer side surface 18*f* is reinforced with the reinforcement plate 16, the collision load can be transmitted, as expected, to the side member 12, in particular, the first outer side surface 18*f* after the crush box 14 is sufficiently collapsed, which can, in turn, cause the side member 12 to be folded at the desired position (the folding site 50). Moreover, in this example, the gusset portion 42 protruded outward in the vehicle width direction is provided to the front end of the reinforcement plate 16. In this configuration, after the crush box 14 is sufficiently collapsed, the collision load can be received over a broader area, and efficiency in transmission of the collision load can be accordingly increased.

Figure 4:
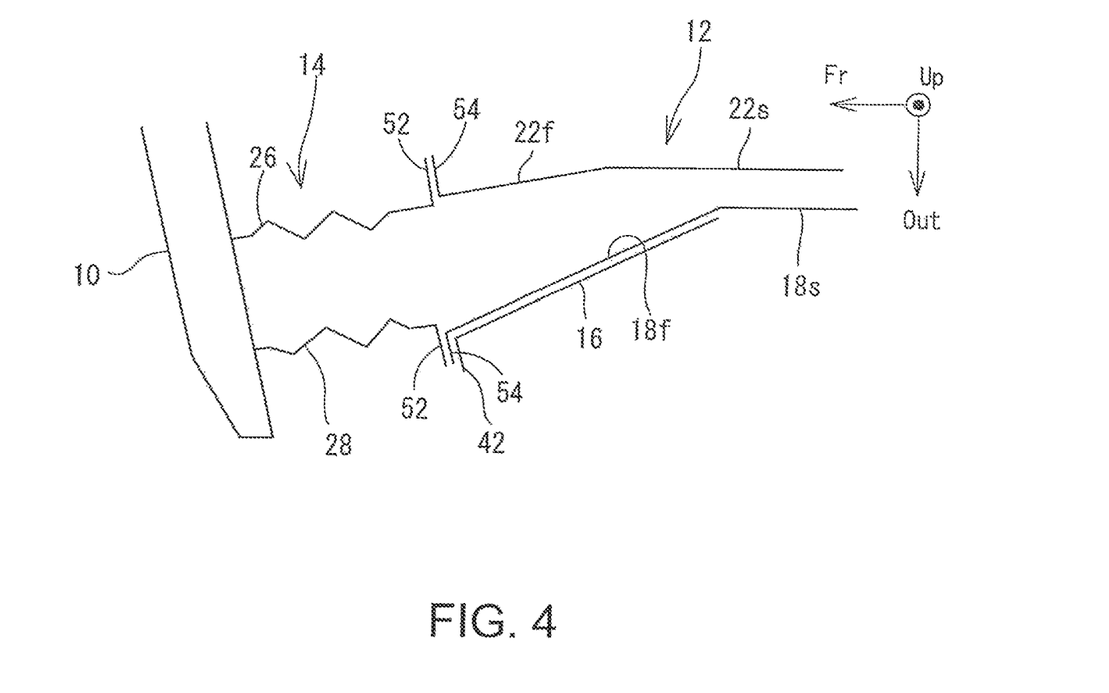
FIG. 4 is a diagram showing an example of another front portion structure of a vehicle.

Meanwhile, as shown in FIG. 4, both the rear end of the crush box 14 and the front end of the side member 12 have conventionally been equipped with flange bodies 52 and 54 which are protruded outward in both the vehicle width direction and a vertical direction, and the crush box 14 and the side member 12 have been connected to each other via the flange bodies 52 and 54 in many cases. In other words, a connector portion (the flange bodies 52 and 54) for connecting the crush box 14 and the side member 12 has usually been arranged substantially orthogonal to the direction in which the load is transmitted. When configured in this way, even in the early phase of a collision (that is, before the crush box 14 is collapsed), the collision load would have been easily transmitted through the connector portion (flange bodies 52 and 54) to the side member 12. Therefore, there has been a possibility that the side member 12 could be folded or deformed before the crush box 14 is sufficiently collapsed.

On the other hand, in the example of this disclosure, the joint portion 32 joined to the rear end of the crush box 14 is connected to the interior periphery surface of the side member 12. In other words, the joint portion 32 for connecting the crush box 14 to the side member 12 is arranged substantially parallel to the direction in which the load is transmitted. In this way, because the load is hardly transmitted through the joint portion 32, the side member 12 is prevented from receiving the collision load in the phase before the crush box 14 is collapsed. As a result, collision energy can be sufficiently absorbed by the crush box 14, which can lead to improved efficiency in absorption of collision energy in the vehicle as a whole.

Figure 5:
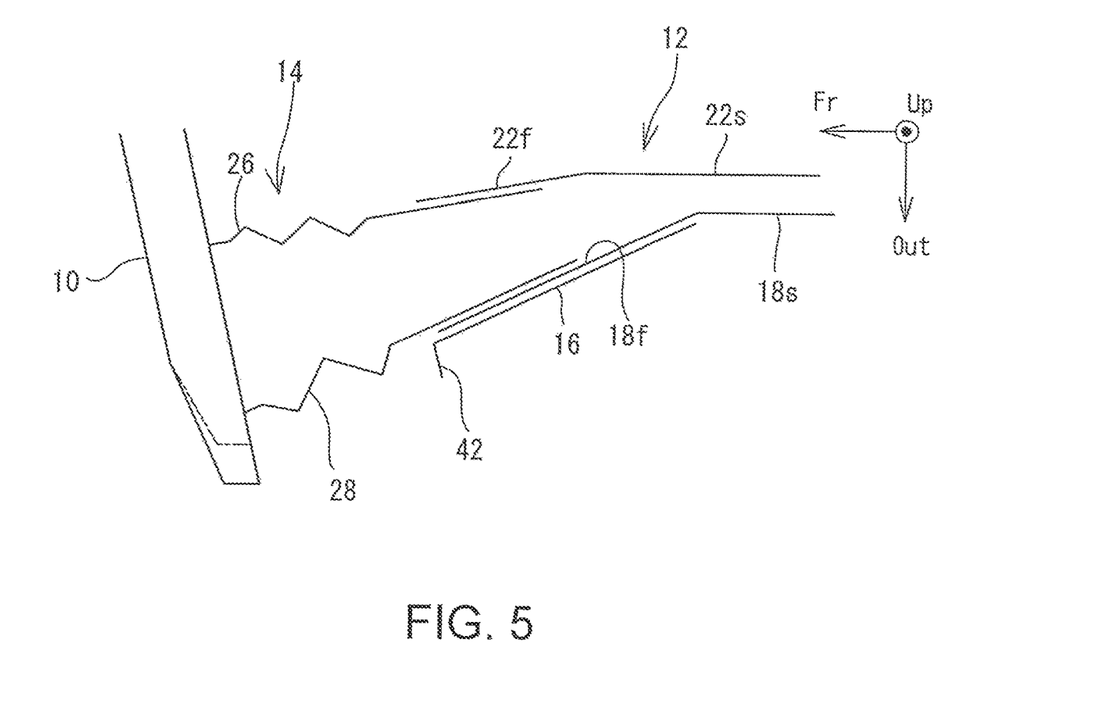
FIG. 5 is a diagram showing, as a comparative example, a further front portion structure of a vehicle.

Meanwhile, in this embodiment, the outer side surface 28 and the inner side surface 26 of the crush box 14 are defined to be approximately parallel to each other. This has an additional effect that the dimension of the front bumper R/F 10 in the vehicle width direction can be reduced. Specifically, as shown in FIG. 5, if the outer side surface 28 of the crush box 14 was inclined inward toward the rear as in the case of the first outer side surface 18f, the width of the front end of the crush box 14 would, of course, become broader. In this case, it would become necessary that the dimension of the front bumper R/F 10 in the vehicle width direction be broadened to accommodate the broader width of the front end of the crush box 14. The broadened dimension of the front bumper R/F 10 in the vehicle width direction would increase constraints on shapes and geometries of the vehicle front portion, resulting in decreased flexibility in design. A chain double-dashed line shown in FIG. 5 represents a shape of the end portion of the front bumper R/F 10 when the outer side surface 28 and the inner side surface 26 of the crush box 14 are formed substantially parallel to each other.

In this embodiment, because the outer side surface 28 and the inner side surface 26 of the crush box 14 are approximately parallel to each other, the width of the crush box 14 is not broadened on its front end. Accordingly, the dimension of the front bumper R/F 10 in the vehicle width direction can be reduced, which can contribute to increased flexibility in design of the front portion of the vehicle.

It should be noted that the above-described structure is presented by way of illustration, and various features of the structure may be modified or changed as appropriate, other than the features that the first outer side surface 18f is at the position being bent with respect to the outer side surface 28 of the crush box 14, and that the reinforcement plate 16 is attached to the first outer side surface 18f. For example, as long as the reinforcement plate 16 can be attached to the first outer side surface 18f, the size and the shape of the reinforcement plate 16 may be changed as appropriate, and, for example, the gusset portion 42 may be omitted from the reinforcement plate 16. In addition, the crush box 14 may be connected to the side member 12, as shown in FIG. 4, via the flange bodies 52 and 54 protruded in both the vehicle width direction and the vertical direction.

Moreover, it has been explained as an action in this embodiment that transmission of the load to the side member 12 is hindered until the crush box 14 is sufficiently collapsed, and after the crush box 14 is sufficiently collapsed, the load is effectively transmitted to the side member 12, to thereby cause the side member 12 to be folded at the desired position (the folding site 50). The action can occur not only at the time of a micro wrap collision but also at the time of other types of collision (such as a front wrap collision, an offset collision).

REFERENCE SIGNS LIST 10 front bumper R/F; 11i bumper inner panel; 11o bumper outer panel; 12 side member; 12f first region; 12s second region; 13i side member inner panel; 13o side member outer panel; 14 crush box; 16 reinforcement plate; 18f first outer side surface; 18s second outer side surface; 22f first inner side surface; 22s second inner side surface; 26 inner side surface of crush box; 28 outer side surface of crush box; 30 bead; 32 joint portion; 34 connector plate; 35 plate-side fastening hole; 36 weld nut; 38 fastening bolt; 40 reinforcement bead; 42 gusset portion; 50 folding site; 52, 54 flange body; 100 obstacle.

The invention claimed is:

1. A front portion structure of a vehicle, comprising:
a front bumper reinforcement extending along a vehicle width direction;
a side member disposed rearward of the front bumper reinforcement in the vehicle so as to extend along a vehicle longitudinal direction; and
a crush box disposed between the front bumper reinforcement and the side member; wherein
the side member has a first region connected to the crush box and a second region extending from a rear end of the first region;
a vehicle-widthwise outer side surface of the side member in the first region is arranged at a position being bent with respect to a vehicle-widthwise outer side surface of the crush box so as to form a protrusion protruding outward in the vehicle width direction;
a vehicle-widthwise outer side surface of the side member in the second region is arranged at a position being bent with respect to the vehicle-widthwise outer side surface in the first region so as to form another protrusion protruding inward in the vehicle width direction, and
a reinforcement plate is attached to the vehicle-widthwise outer side surface in the first region.

2. The front portion structure of a vehicle according to claim 1, wherein an angle of inclination of the vehicle-widthwise outer side surface in the first region relative to the vehicle longitudinal direction is greater than an angle of inclination of the vehicle-widthwise outer side surface of the crush box relative to the vehicle longitudinal direction.

3. The front portion structure of a vehicle according to claim 1, wherein:
the crush box is connected via a joint portion to the side member, and the joint portion is integrally formed with the crush box so as to extend from a rear end of the crush box, and is joined to an interior peripheral surface of the side member.

4. The front portion structure of a vehicle according to claim 1, wherein the reinforcement plate is formed in a shape that covers substantially an entire area of the vehicle-widthwise outer side surface in the first region.

5. The front portion structure of a vehicle according to claim 1, wherein a front end of the reinforcement plate is equipped with a gusset portion protruding outward in the vehicle width direction.

\* \* \* \* \*

UNITED STATES PATENT AND TRADEMARK OFFICE
CERTIFICATE OF CORRECTION

PATENT NO. : 11,027,682 B2
APPLICATION NO. : 16/542909
DATED : June 8, 2021
INVENTOR(S) : Yoshitaka Sotoyama It is certified that error appears in the above-identified patent and that said Letters Patent is hereby corrected as shown below:

In the Specification

Column 3, Line 15, delete "firom" and insert --from--, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*